(12) United States Patent
Minato et al.

(10) Patent No.: US 7,400,491 B2
(45) Date of Patent: Jul. 15, 2008

(54) ALUMINUM ELECTROLYTIC CAPACITOR AND METHOD OF PRODUCING THE SAME

(75) Inventors: Koichiro Minato, Kyoto (JP); Hiroshi Kurimoto, Yamaguchi (JP); Junji Yamane, Yamaguchi (JP); Yoshihiro Watanabe, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 173 days.

(21) Appl. No.: 10/588,258

(22) PCT Filed: Feb. 2, 2005

(86) PCT No.: PCT/JP2005/001494

§ 371 (c)(1),
(2), (4) Date: Aug. 3, 2006

(87) PCT Pub. No.: WO2005/076300

PCT Pub. Date: Aug. 18, 2005

(65) Prior Publication Data

US 2007/0165362 A1 Jul. 19, 2007

(30) Foreign Application Priority Data

Feb. 5, 2004 (JP) .............................. 2004-029081

(51) Int. Cl.
*H01G 2/10* (2006.01)
(52) U.S. Cl. ....................... 361/517; 361/516; 361/519; 361/523; 361/525; 361/528; 29/25.01; 29/25.03
(58) Field of Classification Search ................. 361/517, 361/516, 519, 523–525, 528–534, 508–512, 361/502–504; 29/25.01, 25.03
See application file for complete search history.

(56) References Cited

U.S. PATENT DOCUMENTS 5,847,919 A * 12/1998 Shimizu et al. ............. 361/517

(Continued)

FOREIGN PATENT DOCUMENTS

EP 1 294 031 3/2003

(Continued)

*Primary Examiner*—Nguyen T Ha
(74) *Attorney, Agent, or Firm*—Wenderoth, Lind & Ponack, L.L.P.

(57) ABSTRACT

Disclosed is an aluminum electrolytic capacitor, which comprises a capacitor element prepared by rolling an anode foil and a cathode foil together with a separator and impregnating them with a driving electrolyte, an anode lead electrically connected to the anode foil, a cathode lead electrically connected to the cathode foil, a tubular metal case having one closed end and the other open end and containing the capacitor element, and a sealing member hermetically closing the open end, wherein the anode and cathode leads are bent along an outer surface of the sealing member. In this aluminum electrolytic capacitor, the sealing member is comprised of a rubber composition containing a rubber component having, as a constituent, a butyl rubber prepared by crosslinking an isobutylene-isoprene copolymer having an unsaturation degree of 1.2 to 2.5 mol %, with an alkyl-phenol-formaldehyde resin, and 100 to 200 mass parts of reinforcing filler with respect to 100 mass parts of the rubber component. The rubber composition has a Wallace hardness according to International Rubber Hardness Degree (IRHD) of 80 Hw or more, and a tensile elastic modulus at a solder reflow temperature of 4 N/mm$^2$ or more.

7 Claims, 3 Drawing Sheets

U.S. PATENT DOCUMENTS

| | | | |
|---|---|---|---|
| 6,128,179 A * | 10/2000 | Morokuma | 361/517 |
| 6,690,573 B2 * | 2/2004 | Honda et al. | 361/509 |
| 6,869,719 B2 * | 3/2005 | Hatoh et al. | 429/35 |
| 7,099,143 B1 * | 8/2006 | Fife et al. | 361/516 |
| 7,268,996 B1 * | 9/2007 | Dapo et al. | 361/503 |
| 7,279,015 B2 * | 10/2007 | Merker | 29/25.03 |
| 2002/0139553 A1 | 10/2002 | Minato et al. | |

FOREIGN PATENT DOCUMENTS

| | | |
|---|---|---|
| JP | 04-012514 | 1/1992 |
| JP | 04-19695 | 3/1992 |
| JP | 07-122467 | 5/1995 |
| JP | 07-307254 | 11/1995 |
| JP | 09-275045 | 10/1997 |
| JP | 2001-351587 | 12/2001 |
| JP | 2002-203751 | 7/2002 |
| JP | 2002-289482 | 10/2002 |
| JP | 2003-031448 | 1/2003 |

* cited by examiner

ALUMINUM ELECTROLYTIC CAPACITOR AND METHOD OF PRODUCING THE SAME

TECHNICAL FIELD

The present invention relates to an aluminum electrolytic capacitor for use in various electronic devices, and a production method therefore.

BACKGROUND ART

Figure 2:
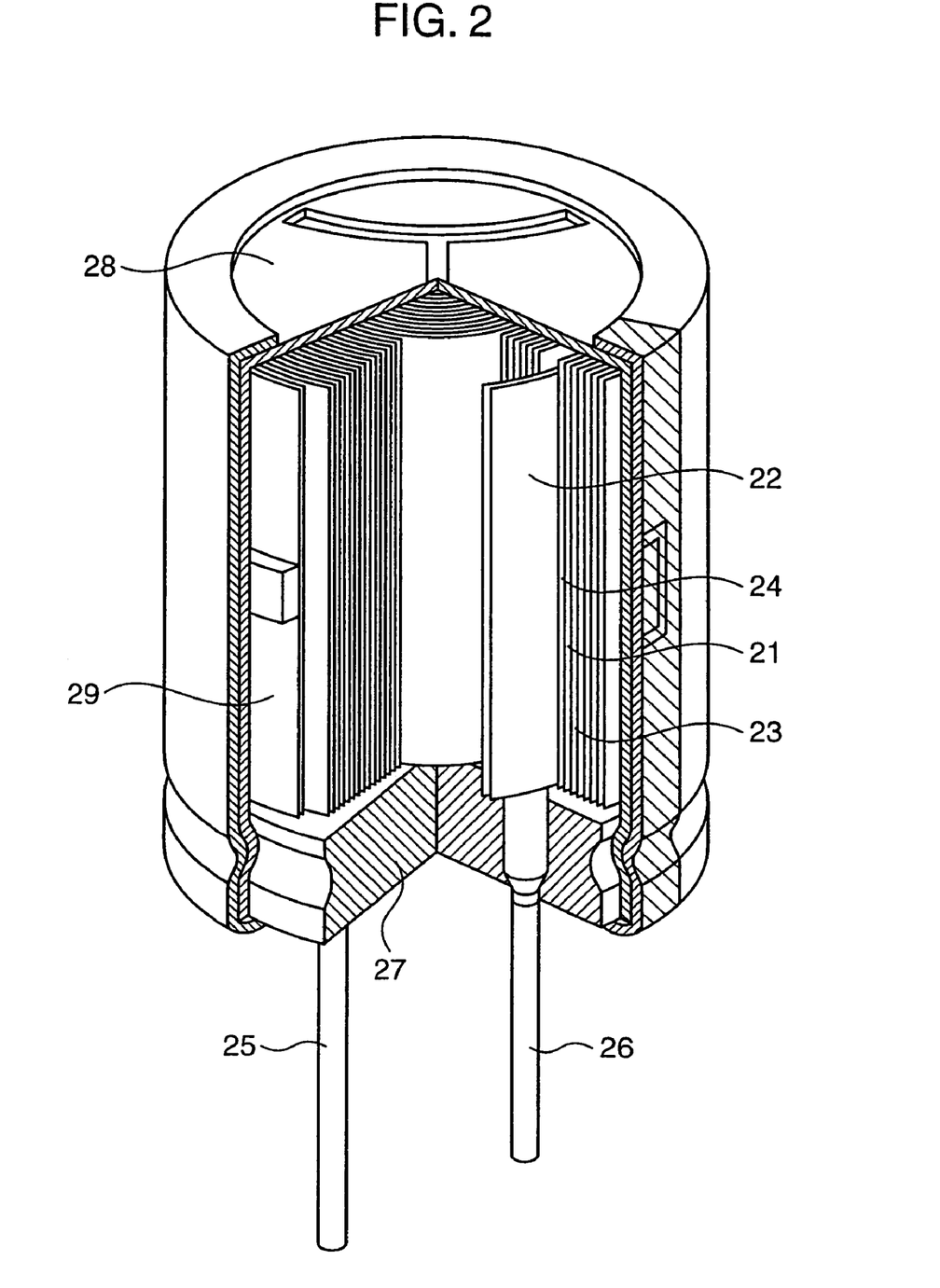
FIG. 2 is a partly sectional perspective view showing the structure of a conventional aluminum electrolytic capacitor.

FIG. 2 is a partly sectional perspective view showing the structure of a conventional aluminum electrolytic capacitor.

A capacitor element 29 in FIG. 2 is prepared by rolling an anode foil 21 and a cathode foil 22 through a separator 23, wherein the anode foil 21 is obtained by etching a surface of an aluminum foil to increase its effective surface area and subjecting the surface to a chemical conversion treatment to form a dielectric oxide film thereon, and the cathode foil 22 is obtained by etching a surface of an aluminum foil. An anode lead 25 and a cathode lead 26 are connected, respectively, to the anode foil 21 and the cathode foil 22 of the capacitor element 29.

Then, after the capacitor element 29 is impregnated with driving electrolyte 24 and inserted into a metal case 28, such as an aluminum case, the metal case 28 is sealed with a sealing member 27 made of rubber or the like to provide the aluminum electrolytic capacitor as shown in FIG. 2. The above sealing can be achieved by inserting the sealing member 27 into the metal case 28 and then hermetically closing the metal case 28 through curling and drawing.

In connection with the recent need for downsizing and higher reliability of electronic devices, it is required to provide a downsized aluminum electrolytic capacitor, and a surface-mount type aluminum electrolytic capacitor to be mounted directly on a surface of a printed board by reflow soldering is being developed.

Figure 3:
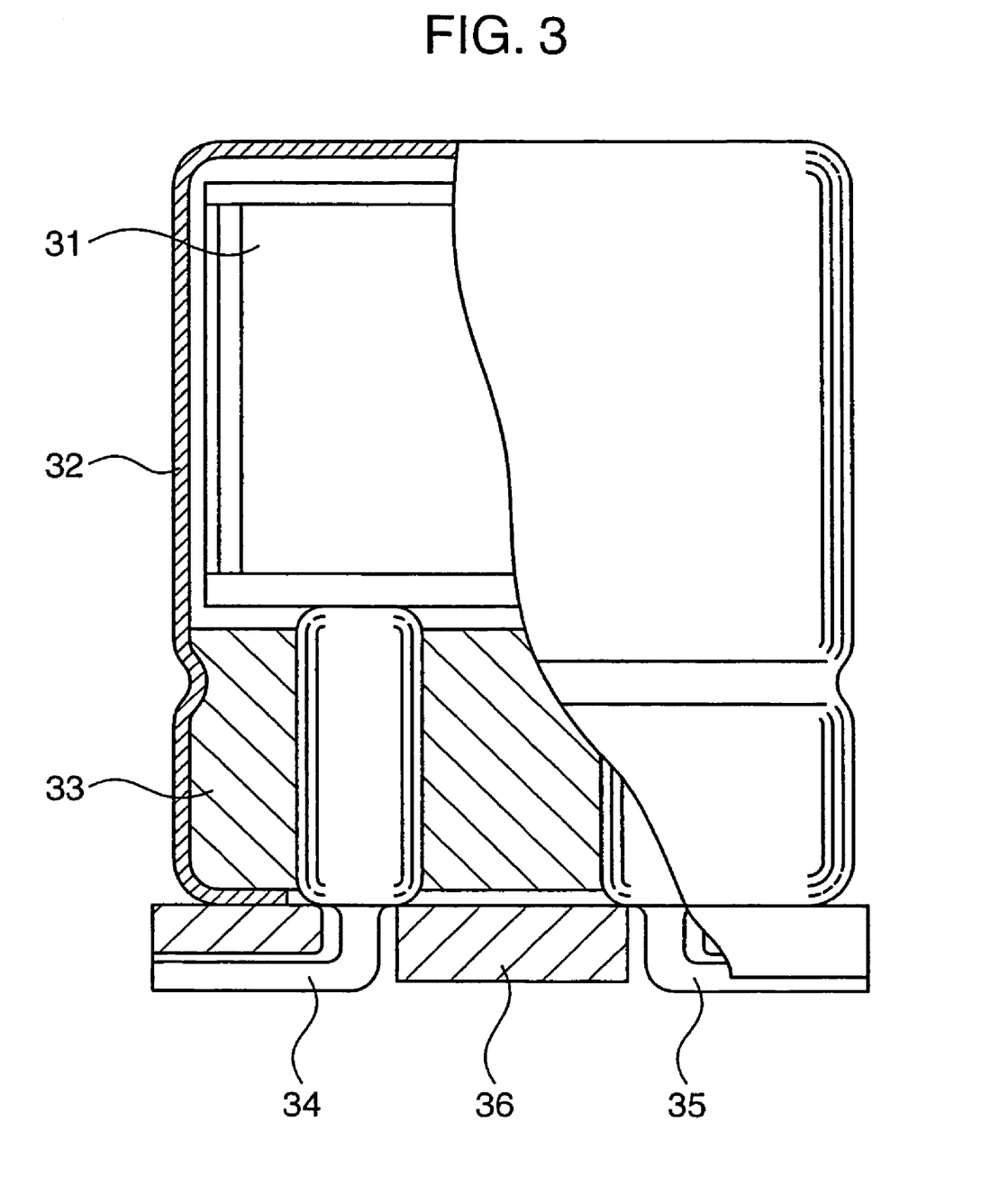
FIG. 3 is a sectional view showing the structure of the conventional aluminum electrolytic capacitor.

One example of a sectional view of the surface-mount type aluminum electrolytic capacitor is shown in FIG. 3 (see Japanese Patent Laid Open Publication No. 09-275045 (Patent Publication 1), and Japanese Patent Publication No. 04-019695 (Patent Publication 2)).

In FIG. 3, the reference numeral 31 indicates a capacitor element; 32 indicates a metal case receiving therein the capacitor element 31 impregnated with driving electrolyte (not shown); 33 indicates an elastic sealing member for sealing an open end of the metal case 32; 34 and 35 indicate, respectively, an anode lead and a cathode lead which are led from the capacitor element 31; and 36 indicates an insulative seat plate. The insulative seat plate 36 is provided as a means to protect the capacitor element 31 from heat during reflow soldering.

A process of producing a surface-mount type aluminum electrolytic capacitor, which is disclosed in the above Patent Publications 1 and 2, is required to include an operation for disposing the insulative seat plate 36 in such a manner as to come into contact with a curlingly-sealed open edge of the metal case 32, and then bending the anode and cathode leads 34, 35 each having a flattened top end in such a manner that they are fitted in a concave portion formed in an outer surface of the insulative seat plate 36. This assembling operation leading to increase in process time causes problems about considerable complication in production process and increase in production costs.

Moreover, the surface-mount type aluminum electrolytic capacitor additionally including the insulative seat plate 36 as compared with a conventional discrete-type aluminum electrolytic capacitor involves another problem about increase in overall dimension due to the thickness of the insulative seat plate 36.

In order to solve the above problems, Japanese Patent Laid Open Publication No. 04-012514 (Patent Publication 3) proposes an aluminum electrolytic capacitor designed such that anode and cathode leads are bent along an outer surface of a sealing member without providing any insulative seat plate.

However, the surface-mount type aluminum electrolytic capacitor disclosed in the above Patent Publication 3 cannot assure an adequate heat resistance due to nonuse of an insulative seat plate, and involves a problem that, when the aluminum electrolytic capacitor is surface-mounted on a board by reflow soldering, a sealing member is liable to be deformed to cause a problem about the occurrence of a mounting defect.

Particularly as to mounting means for electronic devices, in late years, the use of a solder containing no Pb (Pb-free solder) has been promoted as one of measures to protect the global environment. The Pb-free solder has a melting point (about 240 to 270° C.) greater than that (about 220 to 240° C.) of a conventional solder, and the reflow soldering using the Pb-free solder is performed at a higher reflow temperature than a conventional reflow temperature. Accordingly, the level of heat resistance required for recent aluminum electrolytic capacitors becomes higher than ever before, and thereby the above aluminum electrolytic capacitor using no insulative seat plate has difficulties in practical use due to frequent occurrence of the deformation of the sealing member and the resulting mounting defect.

As a conventionally known material of a sealing member, for example, a rubber material such as peroxide-cured, resin-cured, sulfur-cured or quinoid-cured butyl rubber, and peroxide-cured or sulfur-cured ethylene-propylene rubber was described in the Patent Publication 1.

However, in the rubber material disclosed in the Patent Publication 1, a reinforcing filler has to be added thereto in a larger amount to assure a desired heat resistance (an elastic modulus at high temperature) capable of withstanding the reflow soldering using the Pd-free solder. In case where the reinforcing filler is added in a larger amount, the content of rubber component will be relatively reduced and maintaining of highly air-tightness sealing property in the capacitor element will be difficult due to insufficient elasticity as a material of the sealing member. Specifically, the operation for hermetically sealing the capacitor element in the metal case includes drawing and curling. If the sealing member has a low elasticity, the drawing and curling can hardly be performed to keep the sealing member in close contact with the metal case so as to obtain an adequate sealing performance, and are likely to cause cracks in the sealing member.

With a view to maintaining the elasticity of the sealing member in cases where a reinforcing filler is added to the sealing member in a larger amount to provide enhanced heat resistance in the rubber component thereof, the inventers also made researches on a mean of lowering the crosslinking degree of the rubber component.

However, if the crosslinking degree of the aforementioned conventional butyl rubber is lowered, its hardness will also be lowered. Thus, when an aluminum electrolytic capacitor having no insulative seat plate and using the sealing member made of the butyl rubber with a low crosslinking degree is surface-mounted on a board by the reflow soldering using the Pb-free solder, the sealing member is easily deformed due to its low hardness, which is likely to cause an undesirable phenomenon, such as leakage of the driving electrolyte, and/or a mounting defect. For this reason, it is difficult to put the above mean to practical use.

It is therefore an object of the present invention to provide a surface-mount type aluminum electrolytic capacitor to be mounted on a surface of a board by reflow soldering, capable of obtaining an adequate sealing performance without the occurrence of cracks and other defect in a sealing member during drawing and curling in a production process for the capacitor, and suppressing the occurrence of a mounting defect and other defect due to deformation in the sealing member even at a reflow temperature of a Pb-free solder without providing any insulative seat plate.

DISCLOSURE OF INVENTION

Through various researches for solving the aforementioned conventional problems, the inventors have finally conceived the present invention.

Specifically, the present invention provides an aluminum electrolytic capacitor comprising: a capacitor element prepared by rolling an anode foil and a cathode foil together with a separator, said capacitor element being impregnated with a driving electrolyte; an anode lead connected to said anode foil; a cathode lead connected to said cathode foil; a tubular metal case having one closed end and the other open end, and containing said capacitor element; and a sealing member hermetically closing said open end, wherein said anode and cathode leads are bent along an outer surface of said sealing member, wherein said sealing member is comprised of a rubber composition containing: a rubber component having, as a primary constituent, a butyl rubber prepared by crosslinking an isobutylene-isoprene copolymer having an unsaturation degree of 1.2 to 2.5 mol %, with an alkyl-phenol-formaldehyde resin; and 100 to 200 mass parts of reinforcing filler with respect to 100 mass parts of said rubber component, said rubber composition having a Wallace hardness according to International Rubber Hardness Degree (IRHD) of 80 Hw or more, and a tensile elastic modulus at a solder reflow temperature of 4 N/mm² or more.

The present invention also provides a method of producing an aluminum electrolytic capacitor. The method comprises: rolling an anode foil connected to an anode lead and a cathode foil connected to a cathode lead together with a separator to prepare a capacitor element, and impregnating said capacitor element with a driving electrolyte; inserting said capacitor element into a tubular metal case having one closed end and the other open end; hermetically closing said open end by a sealing member; and bending said anode and cathode leads along an outer surface of said sealing member, wherein said sealing member is comprised of a rubber composition containing: a rubber component having, as a primary constituent, a butyl rubber prepared by crosslinking an isobutylene-isoprene copolymer having an unsaturation degree of 1.2 to 2.5 mol %, with an alkyl-phenol-formaldehyde resin; and 100 to 200 mass parts of reinforcing filler with respect to 100 mass parts of said rubber component, wherein said sealing member is prepared by kneading a mixture comprising said isobutylene-isoprene copolymer, said alkyl-phenol-formaldehyde resin and said reinforcing filler, molding said kneaded mixture under reduced pressure, and then annealing the obtained product to treatment under reduced pressure.

The sealing member of the aluminum electrolytic capacitor of the present invention comprises the rubber component having, as a primary constituent, the butyl rubber prepared by crosslinking the isobutylene-isoprene copolymer with the alkyl-phenol-formaldehyde resin. The butyl rubber prepared by crosslinking the isobutylene-isoprene copolymer with the alkyl-phenol-formaldehyde resin is an elastic material with a network structure with an indefinitely large number of meshes, which has no or less the risk that an adequate elasticity as a butyl rubber is spoiled, even if the reinforcing filler is contained therein in the range of 100 to 200 mass parts with respect to 100 mass parts of the rubber component so as to enhance hardness and heat resistance of the sealing member.

Thus, when the composition comprising the above rubber component is used as a sealing member in a downsized aluminum electrolytic capacitor having no insulative seat plate, the sealing member can have enhanced heat resistance, thereby a mounting defect, which would otherwise be caused by deformation of a sealing member or the like, can be suppressed even during the reflow soldering using the Pb-free solder.

In addition, during drawing and curling in a production process for the aluminum electrolytic capacitor, the risk of the occurrence of cracks can be prevented, thereby the occurrence of leakage of the driving electrolyte from within the capacitor and other defect can be prevented.

BEST MODE FOR CARRYING OUT THE INVENTION

The present invention will now be described in detail in connection with one embodiment thereof.

Figure 1:
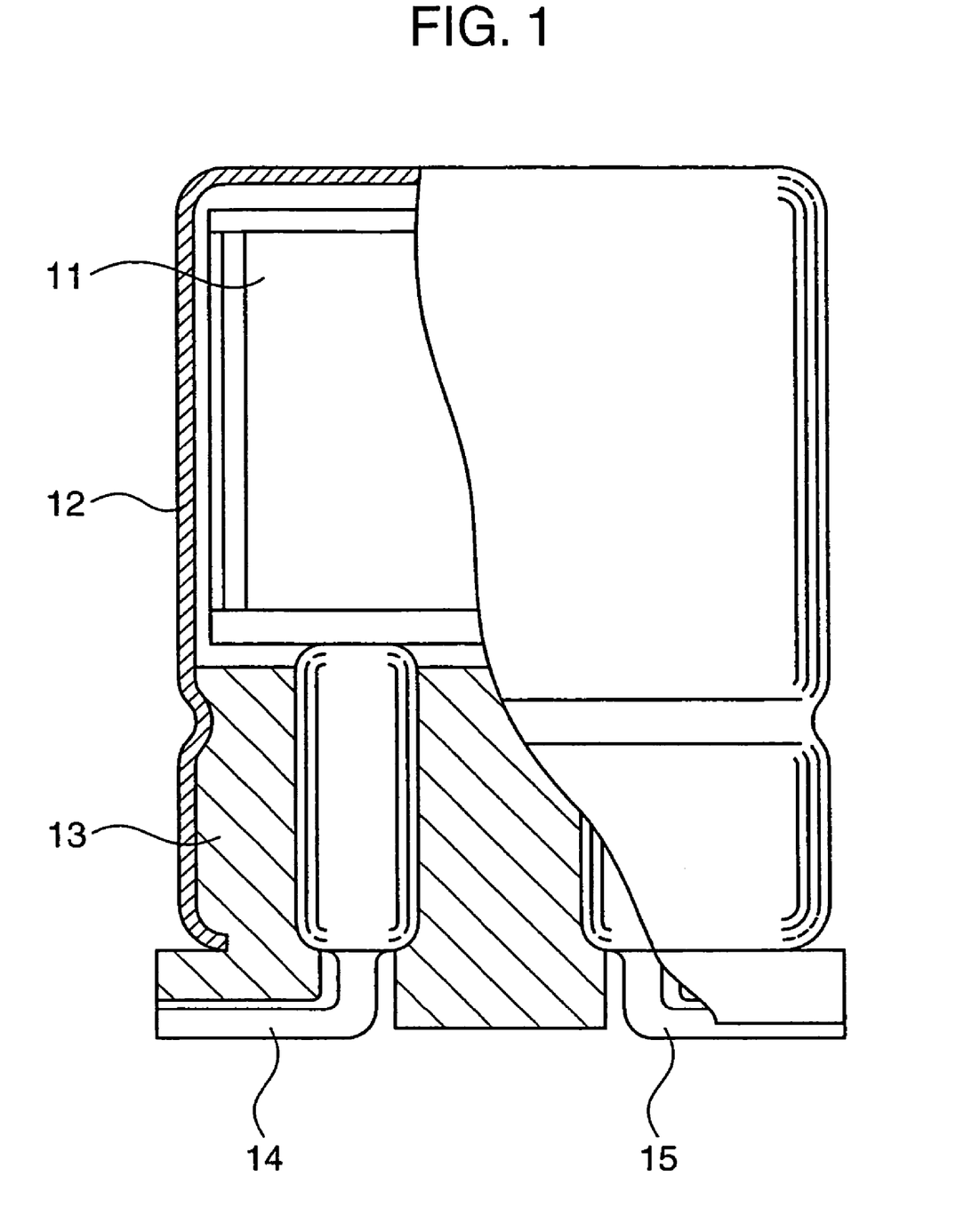
FIG. 1 is a sectional view showing the structure of an aluminum electrolytic capacitor according to one embodiment of the present invention.

FIG. 1 is a sectional view showing the structure of an aluminum electrolytic capacitor according to one embodiment of the present invention. In the FIG. 1, the reference numeral 11 indicates a capacitor element. In the capacitor element 11, an aluminum electrode foil having a surface, which is roughened and then subjected to a chemical conversion treatment to form a dielectric oxide film thereon, is used as an anode foil, and an aluminum electrode foil having a roughened surface is used as a cathode foil. Then, the capacitor element 11 is prepared by rolling the anode foil and the cathode foil together with a separator interposed therebetween.

The reference numeral 12 indicates a metal case containing the capacitor element 11 which is impregnated with driving electrolyte (not shown), and the reference numeral 13 indicates a sealing member hermetically closing an open end of the metal case 12 and having a shape formed suitably for surface mounting. The reference numerals 14 and 15 indicate, respectively, an anode lead and a cathode lead which are led, respectively, from the anode foil and the cathode foil of the capacitor element 11.

The sealing member 13 is formed with a pair of through-holes for allowing the anode lead 14 and the cathode lead 15 to penetrate therethrough. After each of the anode and cathode leads 14, 15 is passed through the corresponding through-hole, and then the sealing member 13 is inserted into the open end of the metal case 12, the open end of the metal case 12 is bent inwardly to press the sealing member 13, and a peripheral surface of the metal case 12 is further subjected to drawing, so that the open end of the metal case 12 is hermetically closed or sealed by utilizing elasticity of the sealing member 13.

In the present invention, the sealing member 13 is comprised of a rubber composition containing: a rubber component having, as a primary constituent, a butyl rubber prepared by crosslinking an isobutylene-isoprene copolymer having an unsaturation degree of 1.2 to 2.5 mol %, with an alkyl-phenol-formaldehyde resin; and 100 to 200 mass parts of reinforcing filler with respect to 100 mass parts of the rubber component, wherein the rubber composition has a Wallace hardness according to International Rubber Hardness Degree (IRHD) of 80 Hw or more, and a tensile elastic modulus at a solder reflow temperature of 4 N/mm² or more.

The isobutylene-isoprene copolymer having an unsaturation degree of 1.2 to 2.5 mol % is a constituent of a butyl rubber which is a primary constituent of the rubber component, and is crosslinked with the alkyl-phenol-formaldehyde resin to form a butyl rubber.

The term "unsaturation degree" herein means a mol concentration of isoprene units constituting the isobutylene-isoprene copolymer.

If the unsaturation degree is less than 1.2 mol %, a crosslinking degree will be lowered to provide a poor hardness in an obtained sealing member, which is liable to cause the occurrence of a mounting defect due to deformation of the sealing member when subjected to reflow soldering. If the unsaturation degree is greater than 2.5 mol %, an obtained sealing member will have an excessively high hardness or a poor elasticity, which leads to difficulties in assuring the performance for hermetically sealing the open end of the metal case.

The above isobutylene-isoprene copolymer has a Mooney viscosity ($ML_{1+8}$, 125° C.), preferably, of 30 to 80, more preferably, of 40 to 60, in view of reducing a compression strain at a high temperature.

In the present invention, the alkyl-phenol-formaldehyde resin is used as a crosslinking agent for the isobutylene-isoprene copolymer.

The alkyl-phenol-formaldehyde resin is represented by the following chemical formula (I):

(I)

wherein R is an alkyl group having 4 to 12 carbon atoms, and m is an integer number ranging from 1 to 10.

As the alkyl-phenol-formaldehyde resin, derivatives thereof may be suitably used. However, in the present invention, the derivatives of the alkyl-phenol-formaldehyde resin should not include any halide. The reason comes from the fact that a metal halide is used in a production process for a halogenated alkyl-phenol-formaldehyde resin, and the remaining halide will undesirably facilitate corrosion in the inside of the capacitor.

The crosslinking of the isobutylene-isoprene copolymer with the alkyl-phenol-formaldehyde resin allow a crosslinking reaction to be accelerated so as to provide an enhanced crosslinking degree. Thus, even if the sealing member contains 100 to 200 mass parts of reinforcing filler with respect to 100 mass parts of the rubber component, the butyl rubber can adequately preserve a network structure with an indefinitely large number of meshes so as to maintain a sufficient elasticity to assure a sealing performance of the sealing member.

With respect to 100 mass parts of the isobutylene-isoprene copolymer, the amount of the alkyl-phenol-formaldehyde resin is preferably in the range of 5 to 30 mass parts, more preferably in the range of 10 to 20 mass parts. If the amount of the alkyl-phenol-formaldehyde resin is less than 5 mass parts, it will be liable to be unable to maintain a sufficient elasticity to assure a sealing performance of the sealing member. If the amount of the alkyl-phenol-formaldehyde resin is greater than 30 mass parts, an obtained sealing member will have an excessively high hardness or a poor elasticity, which leads to difficulties in assuring the performance for hermetically sealing the open end of the metal case.

The reinforcing filler for use in the present invention is used conventionally known reinforcing fillers for rubber compositions. A specific example of the reinforcing filler for use in the present invention may include carbon black, sintered clay, fine silica powder, light calcium carbonate and talc.

The reinforcing filler is mixed in the range of 100 to 200 mass parts with respect to 100 mass parts of the rubber component.

In the case where amount of the reinforcing filler is less than 100 mass parts, the effects of providing an enhanced heat resistance and an increased hardness will be deteriorated to cause deformation of the sealing member when subjected to reflow soldering, which is likely to result in the occurrence of a mounting defect and the leakage of the driving electrolyte from within the capacitor. In the case where amount of the reinforcing filler is greater than 200 mass parts, an obtained sealing member will have an excessively high hardness, which is likely to cause the occurrence of cracks in the sealing member during the drawing and curling.

The rubber composition in the present invention may include an additional rubber component to the extent that the above characteristics of the butyl rubber and the effects of the present invention is exhibited. Specifically, the additional rubber component may be include butadiene rubber (BR), styrene-butadiene rubber (SBR), ethylene-propylene copolymer (EPM), ethylene-propylene-diene ternary copolymer (EPDM), urethane rubber (U), silicone rubber (Q) and chlorosulfonated polyethylene rubber (CSM).

The rubber composition in the present invention may further include either one of phenol derivatives and multimers thereof, as an antioxidant, so that adverse affects of heat deterioration due to a solder reflow temperature can be suppressed to maintain the mechanical property, such as tensile strength or hardness, of the sealing member so as to assure the performance for adequately sealing the open end of the metal case.

A specific example of the phenol derivative may include a derivative prepared by substituting at least one of o-position, m-position and p-position of a phenol group with a substituent, such as alkyl group, hydroxyl group or sulfhydryl group. The multimer of the phenol derivative may be prepared by dimerizing or trimerizing the phenol derivative using either one of carbon, sulfur and alkyl group. Specifically, 2,6-Di-tert-butyl-4-methyl phenol, 2,5-Di-tert-amyl hydroquinone, 2,5-Di-tert-butyl hydroquinone and 4-methyl-6-tert-butyl phenol are exemplified.

The rubber composition in the present invention is prepared by mixing the isobutylene-isoprene copolymer, the alkyl-phenol-formaldehyde resin serving as a crosslinking agent and the reinforcing filler, if needed, together with the additional rubber component, the antioxidant, an auxiliary crosslinking agent, a filler and/or an anti-degradation agent, and subjecting them to kneading and crosslinking.

The additional rubber component may be a pre-crosslinked rubber which is to be subjected to the kneading, or may be an uncrosslinked copolymer which is to be kneaded in concurrence with the isobutylene-isoprene copolymer and then crosslinked.

A mixture after the kneading is molded into a given shape suitable as the sealing member, and then subjected to crosslinking.

The molding is performed, for example, using an extruder, preferably under reduced pressure. The molding performed under reduced pressure allows deterioration of the rubber component due to oxidation to be reduced so as to maintain the elasticity of the sealing member.

Preferably, the molding is performed under the condition that a molding temperature is in the range of about 60 to 120° C., and a pressure is reduced to about 1 to 10 Pa.

Then, the sealing member molded into the given shape is subjected to secondary crosslinking by means of an annealing treatment performed under a reduced pressure of 0.1 to 1 Pa at a temperature of 140 to 200° C., so as to obtain a sufficiently crosslinked sealing member.

The rubber composition as a material of the sealing member in the present invention is adjusted to have a Wallace hardness according to International Rubber Hardness Degree (IRHD) of 80 Hw or more, and a tensile elastic modulus at a solder reflow temperature of 4 N/mm$^2$ or more, by appropriately selecting the unsaturation degree of the isobutylene-isoprene copolymer, the type and amount of the alkyl-phenol-formaldehyde resin, and the type and amount of the reinforcing filler.

The rubber composition having the above hardness and elastic modulus allows the sealing member 13 to withstand a solder reflow temperature even if the anode lead 14 and the cathode lead 15 are disposed directly on an outer surface of the sealing member 13.

If the hardness is less than 80 Hw, the sealing member will be liable to be deformed when subjected to reflow soldering, which leads to the occurrence of a mounting defect. Preferably, an upper limit of the hardness is set at 110 Hw or less, in view of maintaining the elasticity of the sealing member so as to sufficiently seal the open end of the metal case.

The term "tensile elastic modulus at a solder reflow temperature" herein means a tensile elastic modulus at the peak of a reflow temperature during an aluminum electrolytic capacitor of the present invention is heated in a reflow oven after mounted on a board.

While the peak reflow temperature depends on a melting point of a solder to be used, the following specific value may be typically cited.

The peak reflow temperature is selected in the range of 220 to 240° C. when the solder is a commonly used type, and selected in the range of 240 to 270° C. when the solder is a Pb-free type particularly having a high melting point. The aluminum electrolytic capacitor of the present invention can maintain a high tensile elastic modulus even when the Pb-free solder is used. The tensile elastic modulus is measured according to JIS K 6254.

The tensile elastic modulus set at 4 N/mm$^2$ or more allows the sealing member to sufficient seal the open end of the metal case so as to assure the performance for hermetically sealing the inside of the capacitor. An upper limit of the tensile elastic modulus is set in a range allowing the sealing of the metal case to be adequately maintained, preferably, at about 8 N/mm$^2$.

As described above, the aluminum electrolytic capacitor in the present invention comprises: the capacitor element prepared by rolling the anode foil connected to the anode lead and the cathode foil connected to the cathode lead together with the separator and impregnating them with the driving electrolyte; the tubular metal case having one closed end and an open end, and containing the capacitor element; and the sealing member hermetically closing the open end, wherein the anode and cathode leads are bent along an outer surface of the sealing member.

The driving electrolyte for use in the present invention may be a solution prepared by dissolving at least one solute selected from an organic acid, an inorganic acid, primary to quaternary ammonium salts of said organic acid or said inorganic acid, imidazolium salts of said organic acid or said inorganic acid, imidazolinium salts of said organic acid or said inorganic acid, and an alicyclic pyrimidine compound into at least one solvent selected from ethylene glycol, γ-butyrolactone, propylene carbonate, sulfolane and water.

The organic acid may include formic acid, acetic acid, propionic acid, maleic acid, citraconic acid, phthalic acid, adipic acid, azelaic acid, benzoic acid, butyl octanoic acid and decane-dicarboxylic acid, and derivatives thereof. The inorganic acid may include boric acid and phosphoric acid.

The imidazolium salts, imidazolinium salts, the alicyclic pyrimidine compound or derivatives thereof may include an imidazoline compound which is quaternarized with an alkyl or arylalkyl group having a carbon number of 1 to 11, an imidazole compound, a benzoimidazole compound and an alicyclic pyrimidine compound. Specifically, the imidazolium salts, imidazolinium salts, the alicyclic pyrimidine compound or derivatives thereof may include: 1-methyl-1,8-diazabicyclo[5,4,0]undecene-7; 1-methyl-1,5-diazabicyclo[4,3,0]nonene-5; 1,2,3-trimethyl imidazolinium; 1,2,3,4-tetramethyl imidazolinium; 1,3-dimethyl-2-ethyl imidazolinium; 1,3,4-trimethyl-2-ethyl imidazolinium; 1,3-dimethyl-2-heptyl imidazolinium; 1,3-dimethyl-2-(3'-heptyl)imidazolinium; 1,3-dimethyl-2-dodecyl imidazolinium; 1,2,3-trimethyl-1,4,5,6-tetrahydro pyrimidium; 1,3-dimethyl imidazolinium; and 1,3-dimethylbenzo imidazolium. These compounds have a high electrical conductivity, and thereby can provide a low-loss aluminum electrolytic capacitor.

When a capacitor element formed an electroconductive polymer, such as polypyrrole, polythiophene or polyaniline, thereon is used together with the above driving electrolyte, an obtained aluminum electrolytic capacitor has a low ESR, and thereby can exhibit excellent stability even at the solder reflow temperature.

Otherwise, when the electroconductive polymer is used as a driving electrolyte without using the above driving electrolyte, an obtained aluminum electrolytic capacitor has a lower ESR (Equivalent Series Resistance), and thereby can exhibit more excellent stability even at the solder reflow temperature.

The present invention will be more specifically described below by showing Examples. Each of the following Examples is just one aspect of the present invention, and the present invention is not limited to such Examples.

EXAMPLE 1

A rolling-type capacitor element prepared by rolling an anode foil having an anode lead electrically connected thereto and a cathode foil having a cathode lead electrically connected thereto together with a separator made of manila fibers and interposed therebetween was impregnated with a driving electrolyte containing an organic solvent consisting of γ-butyrolactone, and a solute consisting of mono (triethylamine)-phthalic acid salt, p-nitrobenzoic acid and phosphoric acid monobutyl ester.

Then, after the capacitor element impregnated with the driving electrolyte was inserted into a tubular aluminum metal case having one closed end and the other open end, a sealing member was inserted. Since then, the open end of the metal case was sealed by curling and drawing, and the anode and cathode leads were bent along an outer surface of the sealing member, to prepare a chip-type aluminum electrolytic capacitor having a rated voltage of 35 V and an electrical capacitance of 2200 μF.

The sealing member was prepared by mixing and kneading an isobutylene-isoprene copolymer having an unsaturation degree of 1.2 mol %, 40 mass parts of carbon black and 60 mass parts of sintered clay serving as a reinforcing filler, 2 mass parts of 2,5-Di-tert-butyl hydroquinone serving as an antioxidant for suppressing adverse affects of heat deterioration due to a solder reflow temperature, and 15 mass parts of alkyl-phenol-formaldehyde resin serving as a crosslinking agent, with respect to 100 mass parts of the isobutylene-isoprene copolymer, molding the obtained mixture into a given shape suitable as the sealing member, and subjecting the formed product to crosslinking.

The molding was performed using an extruder under a given reduced pressure allowing deterioration due to oxidation to be minimized, and the molded product was subjected to secondary crosslinking by means of an annealing treatment performed under a reduced pressure of 0.5 Pa at a temperature of 170° C. for 2 hours.

An obtained crosslinked rubber composition as a material of the sealing member had a Wallace hardness according to International Rubber Hardness Degree (IRHD) of 92 Hw, and a tensile elastic modulus at 260° C. of 4.2 N/mm$^2$.

The obtained chip-type aluminum electrolytic capacitor was mounted on a printed board, and the printed board was subjected to reflow soldering at 260° C. Then, a mounting verification test for checking the occurrence of a mounting defect or a soldering defect due to blistering of the sealing member was performed through appearance observation. In this example, a Sn—Ag based solder was used, and the reflow soldering had a preheating stage performed at 160° C. for 90 seconds and a main heating stage performed at 260° C. for 3 seconds. A test sample was prepared in the number n=30.

EXAMPLE 2

Except that an isobutylene-isoprene copolymer having an unsaturation degree of 2.0 mol % was used in place of the isobutylene-isoprene copolymer in Example 1, a chip-type aluminum electrolytic capacitor was prepared in the same manner as that in Example 1.

An obtained crosslinked rubber composition as a material of the sealing member had a Wallace hardness according to International Rubber Hardness Degree (IRHD) of 93 Hw, and a tensile elastic modulus at 260° C. of 4.3 N/mm$^2$.

EXAMPLE 3

Except that an isobutylene-isoprene copolymer having an unsaturation degree of 2.5 mol % was used in place of the isobutylene-isoprene copolymer in Example 1, a chip-type aluminum electrolytic capacitor was prepared in the same manner as that in Example 1.

An obtained crosslinked rubber composition as a material of the sealing member had a Wallace hardness according to International Rubber Hardness Degree (IRHD) of 97 Hw, and a tensile elastic modulus at 260° C. of 4.5 N/mm$^2$.

EXAMPLE 4

Except that 40 mass parts of carbon black and 120 mass parts of sintered clay serving as a reinforcing filler, and 2 mass parts of 2,6-Di-tert-butyl-4-methyl phenol serving as an antioxidant, were used in place of the reinforcing filler and the antioxidant in Example 1, a chip-type aluminum electrolytic capacitor was prepared in the same manner as that in Example 1.

An obtained crosslinked rubber composition as a material of the sealing member had a Wallace hardness according to International Rubber Hardness Degree (IRHD) of 99 Hw, and a tensile elastic modulus at 260° C. of 5 N/mm$^2$.

EXAMPLE 5

Except that 60 mass parts of carbon black and 140 mass parts of sintered clay serving as a reinforcing filler, and 2 mass parts of 2,6-Di-tert-butyl-4-methyl phenol serving as an antioxidant, were used in place of the reinforcing filler and the antioxidant in Example 1, a chip-type aluminum electrolytic capacitor was prepared in the same manner as that in Example 1.

An obtained crosslinked rubber composition as a material of the sealing member had a Wallace hardness according to International Rubber Hardness Degree (IRHD) of 105 Hw, and a tensile elastic modulus at 260° C. of 5.3 N/mm$^2$.

EXAMPLE 6

Except that a driving electrolyte containing an organic solvent consisting of ethylene glycol, and a solute consisting of ammonium azelate, ammonium borate and ammonium phosphate, was used in place of the driving electrolyte in Example 1, a chip-type aluminum electrolytic capacitor was prepared in the same manner as that in Example 1.

EXAMPLE 7

Except that the capacitor element in Example 1 was immersed in and pulled out of an aqueous solution containing pyrrole (concentration: 0.5 wt %), ammonium persulfate (concentration: 3 wt %) and 1-naphthalenesulfonic acid as an organic acid compound (concentration: 5 wt %) to form an electroconductive polymer of polypyrrole on a surface of the capacitor element through chemical oxidation polymerization utilizing oxidation by the ammonium persulfate, a chip-type aluminum electrolytic capacitor was prepared in the same manner as that in Example 1.

EXAMPLE 8

Except that 80 mass parts of isobutylene-isoprene copolymer having an unsaturation degree of 1.2 mol % and 20 mass parts of ethylene-propylene-diene ternary copolymer were used in place of 100 mass parts of isobutylene-isoprene copolymer having an unsaturation degree of 1.2 mol % in Example 1, and 40 mass parts of carbon black and 120 mass parts of sintered clay serving as a reinforcing filler and 2 mass parts of 2,6-Di-tert-butyl-4-methyl phenol serving as an antioxidant, were used in place of the reinforcing filler and the antioxidant in Example 1, a chip-type aluminum electrolytic capacitor was prepared in the same manner as that in Example 1.

An obtained crosslinked rubber composition as a material of the sealing member had a Wallace hardness according to International Rubber Hardness Degree (IRHD) of 92 Hw, and a tensile elastic modulus at 260° C. of 4.3 N/mm².

Comparative Example 1

Except that an isobutylene-isoprene copolymer having an unsaturation degree of 1.0 mol % was used in place of the isobutylene-isoprene copolymer in Example 1, a chip-type aluminum electrolytic capacitor was prepared in the same manner as that in Example 1.

An obtained crosslinked rubber composition as a material of the sealing member had a Wallace hardness according to International Rubber Hardness Degree (IRHD) of 78 Hw, and a tensile elastic modulus at 260° C. of 3.6 N/mm².

Comparative Example 2

Except that an isobutylene-isoprene copolymer having an unsaturation degree of 0.7 mol % was used in place of the isobutylene-isoprene copolymer in Example 1, and 40 mass parts of carbon black and 40 mass parts of sintered clay serving as a reinforcing filler and 3 mass parts of zinc oxide serving as a crosslinking agent were used together with 1 mass part of stearic acid serving as a lubricant, in place of the reinforcing filler and the crosslinking agent in Example 1, a chip-type aluminum electrolytic capacitor was prepared in the same manner as that in Example 1.

An obtained crosslinked rubber composition as a material of the sealing member had a Wallace hardness according to International Rubber Hardness Degree (IRHD) of 74 Hw, and a tensile elastic modulus at 260° C. of 2.5 N/mm².

Comparative Example 3

Except that 5 mass parts of dicumyl peroxide as an organic peroxide serving as a crosslinking agent was used in place of the crosslinking agent in Example 1, a chip-type aluminum electrolytic capacitor was prepared in the same manner as that in Example 1.

An obtained crosslinked rubber composition as a material of the sealing member had a Wallace hardness according to International Rubber Hardness Degree (IRHD) of 76 Hw, and a tensile elastic modulus at 260° C. of 2.9 N/mm².

Comparative Example 4

Except that an isobutylene-isoprene copolymer having an unsaturation degree of 2.8 mol % was used in place of the isobutylene-isoprene copolymer in Example 1, a chip-type aluminum electrolytic capacitor was prepared in the same manner as that in Example 1.

An obtained crosslinked rubber composition as a material of the sealing member had a Wallace hardness according to International Rubber Hardness Degree (IRHD) of 115 Hw, and a tensile elastic modulus at 260° C. of 4.8 N/mm².

Comparative Example 5

Except that 40 mass parts of carbon black and 30 mass parts of sintered clay serving as a reinforcing filler were used in place of the reinforcing filler in Example 1, a chip-type aluminum electrolytic capacitor was prepared in the same manner as that in Example 1.

An obtained crosslinked rubber composition as a material of the sealing member had a Wallace hardness according to International Rubber Hardness Degree (IRHD) of 71 Hw, and a tensile elastic modulus at 260° C. of 2.2 N/mm².

Comparative Example 6

Except that 120 mass parts of carbon black and 120 mass parts of sintered clay serving as a reinforcing filler were used in place of the reinforcing filler in Example 1, a chip-type aluminum electrolytic capacitor was prepared in the same manner as that in Example 1.

An obtained crosslinked rubber composition as a material of the sealing member had a Wallace hardness according to International Rubber Hardness Degree (IRHD) of 128 Hw, and a tensile elastic modulus at 260° C. of 1.5 N/mm².

The results of respective mounting verification tests for the chip-type aluminum electrolytic capacitors in Examples 1 to 8 and Comparative Examples 1 to 6 are shown in the following Table 1.

In Table 1, the code IIR in the column "rubber component" indicates isobutylene-isoprene copolymer; EPDM in the column "rubber component" indicates ethylene-propylene-diene ternary copolymer; CB in the column "reinforcing filler" indicates carbon black; CL in the column "reinforcing filler" indicates sintered clay; APFA in the column "crosslinking agent" indicates alkyl-phenol-formaldehyde resin; DBHQ in the column "antioxidant" indicates 2,5-Di-tert-butyl hydroquinone; and DBMP in the column "antioxidant" indicates 2,6-Di-tert-butyl-4-methyl phenol.

TABLE 1

| | Composition of Sealing Member | | | | | | | | Tensile | |
| | Rubber Component | | Reinforcing | | | | | | Elastic | |
| | IIR | | EPDM | Filler | | Crosslinking | | | Wallace | Modulus | Rate of |
| | unsaturation degree | mass part | mass part | (mass part) | | Agent (mass part) | | Antioxidant (mass part) | hardness (HW) | (260° C.) (N/mm²) | Mounting Defect |
| | | | | CB | CL | | | | | | |
| Example 1 | 1.2 | 100 | — | 40 | 60 | APFA | 15 | DBHQ 2 | 92 | 4.2 | 0/30 |
| Example 2 | 2.0 | 100 | — | 40 | 60 | APFA | 15 | DBHQ 2 | 93 | 4.3 | 0/30 |
| Example 3 | 2.5 | 100 | — | 40 | 60 | APFA | 15 | DBHQ 2 | 97 | 4.5 | 0/30 |
| Example 4 | 1.2 | 100 | — | 40 | 120 | APFA | 15 | DBMP 2 | 99 | 5.0 | 0/30 |
| Example 5 | 1.2 | 100 | — | 60 | 140 | APFA | 15 | DBMP 2 | 105 | 5.3 | 0/30 |
| Example 6 | 1.2 | 100 | — | 40 | 60 | APFA | 15 | DBHQ 2 | 92 | 4.2 | 0/30 |
| Example 7 | 1.2 | 100 | — | 40 | 60 | APFA | 15 | DBHQ 2 | 92 | 4.2 | 0/30 |
| Example 8 | 1.2 | 80 | 20 | 40 | 120 | APFA | 15 | DBMP 2 | 92 | 4.3 | 0/30 |

TABLE 1-continued

| | Composition of Sealing Member | | | | | | | | | Tensile | |
| --- | --- | --- | --- | --- | --- | --- | --- | --- | --- | --- | --- |
| | Rubber Component | | | Reinforcing | | | | | | Elastic | |
| | IIR | | EPDM | Filler | | Crosslinking | | | Wallace | Modulus | Rate of |
| | unsaturation | mass | mass | (mass part) | | Agent | | Antioxidant | hardness | ($260°$ C.) | Mounting |
| | degree | part | part | CB | CL | (mass part) | | (mass part) | (HW) | (N/mm$^2$) | Defect |
| Comparative Example 1 | 1.0 | 100 | — | 40 | 60 | APFA | 15 | DBHQ 2 | 78 | 3.6 | 3/30 |
| Comparative Example 2 | 0.7 | 100 | — | 40 | 40 | zinc oxide | 3 | DBHQ 2 | 74 | 2.5 | 27/30 |
| Comparative Example 3 | 1.2 | 100 | — | 40 | 60 | peroxide | 5 | DBHQ 2 | 76 | 2.9 | 12/30 |
| Comparative Example 4 | 2.8 | 100 | — | 40 | 60 | APFA | 15 | DBHQ 2 | 115 | 4.8 | 26/30 |
| Comparative Example 5 | 1.2 | 100 | — | 40 | 30 | APFA | 15 | DBHQ 2 | 71 | 2.2 | 28/30 |
| Comparative Example 6 | 1.2 | 100 | — | 120 | 120 | APFA | 15 | DBHQ 2 | 128 | 1.5 | 30/30 |

In Comparative Example 1, the rubber component used as a material of the sealing member was prepared by crosslinking an isobutylene-isoprene copolymer having an unsaturation degree of 1.0 mol % with an alkyl-phenol-formaldehyde resin. Thus, both the hardness and the tensile elastic modulus at 260° C. in Comparative Example 1 were lower than those in Example 1 using an isobutylene-isoprene copolymer having an unsaturation degree of 1.2 mol %, and consequently a mounting defect during reflow soldering occurred in 3 of the 30 test samples.

In Comparative Example 2, the rubber component was prepared by crosslinking an isobutylene-isoprene copolymer having an unsaturation degree of 0.7 mol % with a zinc oxide. Thus, as compared with Example 1, the sealing member in Comparative Example 2 had a low hardness and a considerably low tensile elastic modulus at 260° C., and consequently a mounting defect during reflow soldering occurred in 27 of the 30 test samples.

In Comparative Example 3, the rubber component was prepared by crosslinking an isobutylene-isoprene copolymer having an unsaturation degree of 1.2 mol % with a peroxide. Thus, as compared with Example 1, the sealing member in Comparative Example 3 had a low hardness and a extremely low tensile elastic modulus at 260° C., and consequently a mounting defect during reflow soldering occurred in 12 of the 30 test samples.

In Comparative Example 4, the rubber component was prepared by crosslinking an isobutylene-isoprene copolymer having an unsaturation degree of 2.8 mol % with an alkyl-phenol-formaldehyde resin. Thus, as compared with Example 1, the sealing member in Comparative Example 4 had an extremely high hardness, and consequently a mounting defect during reflow soldering occurred in 26 of the 30 test samples.

In Comparative Example 5, only 70 mass parts of reinforcing filler was mixed. Thus, as compared with Example 1, the sealing member in Comparative Example 5 had a low hardness and a low heat resistance, and consequently a mounting defect during reflow soldering occurred in 28 of the 30 test samples.

In Comparative Example 6, a large amount, or 240 mass parts, of reinforcing filler was mixed. Thus, as compared with Example 1, the sealing member in Comparative Example 6 had an extremely high hardness and a low elastic modulus, and consequently a mounting defect during reflow soldering occurred in 30 of the 30 test samples.

As seen in the above results, the aluminum electrolytic capacitor according to the aforementioned embodiment uses a butyl rubber crosslinked with an alkyl-phenol-formaldehyde resin, as a rubber component of a material of the sealing member used therein. Thus, the rubber component has a network structure with an indefinitely large number of meshes, and thereby can assure a high hardness while maintaining the elasticity as a butyl rubber, so as to allow a sealing member to be prepared from a rubber composition having a Wallace hardness according to International Rubber Hardness Degree (IRHD) of 80 Hw or more, and a tensile elastic modulus at a solder reflow temperature of 4 N/mm$^2$ or more.

In addition, as described above, 100 to 200 mass parts of reinforcing filler can be added with respect to 100 mass parts of the rubber component to provide enhanced heat resistance while maintaining adequate elasticity. Thus, even if an aluminum electrolytic capacitor is designed to be surface-mounted using only a sealing member without any insulative seat plate, the risk of deformation of the sealing member can be prevented to provide an excellent mounting performance at a low cost.

The aluminum electrolytic capacitor of the present invention can be designed using a sealing member having a surface-mounting function in such a manner to allow the deformation of the sealing member and the occurrence of a mounting defect to be suppressed even if it is subjected to reflow soldering using a Pb-free solder, without the need of an insulative seat plate. This makes it possible to facilitate downsizing in an aluminum electrolytic capacitor capable of being subjected to reflow soldering using a Pb-free solder.

INDUSTRIAL APPLICABILITY

The present invention can provide a downsized surface-mount type aluminum electrolytic capacitor capable of suppressing the occurrence of a mounting defect and other defect due to deformation of a sealing member, even at a reflow temperature of a Pb-free solder. Thus, the present invention can achieve downsizing and higher reliability in electronic devices.

What is claimed is:

1. An aluminum electrolytic capacitor comprising:
a capacitor element prepared by rolling an anode foil and a cathode foil together with a separator, said capacitor element being impregnated with a driving electrolyte;
an anode lead connected to said anode foil;
a cathode lead connected to said cathode foil;
a tubular metal case having one closed end and the other open end, and containing said capacitor element; and
a sealing member hermetically closing said open end, wherein said anode and cathode leads are bent along an outer surface of said sealing member,
wherein said sealing member is comprised of a rubber composition containing:
a rubber component having, as a primary constituent, a butyl rubber prepared by crosslinking an isobutylene-isoprene copolymer having an unsaturation degree of 1.2 to 2.5 mol %, with an alkyl-phenol-formaldehyde resin; and
100 to 200 mass parts of reinforcing filler with respect to 100 mass parts of said rubber component,
said rubber composition having a Wallace hardness according to International Rubber Hardness Degree (IRHD) of 80 Hw or more, and a tensile elastic modulus at a solder reflow temperature of 4 N/mm² or more.

2. The aluminum electrolytic capacitor as defined in claim 1, wherein said alkyl-phenol-formaldehyde resin is represented by the following general formula (I):

wherein R is an alkyl group having 4 to 12 carbon atoms, and m is an integer number ranging from 1 to 10.

3. The aluminum electrolytic capacitor as defined in claim 1, wherein said solder reflow temperature is in the range of 240 to 270° C.

4. The aluminum electrolytic capacitor as defined in claim 1, wherein said rubber composition contains at least one of phenol derivatives and multimer thereof.

5. The aluminum electrolytic capacitor as defined in claim 1, wherein said driving electrolyte is a solution prepared by dissolving at least one solute selected from an organic acid, an inorganic acid, primary to quaternary ammonium salts of said organic acid or said inorganic acid, imidazolium salts of said organic acid or said inorganic acid, imidazolinium salts of said organic acid or said inorganic acid, and an alicyclic pyrimidine compound into at least one solvent selected from ethylene glycol, γ-butyrolactone, propylene carbonate, sulfolane and water.

6. The aluminum electrolytic capacitor as defined in claim 1, wherein each of said anode and cathode foils of said capacitor element has a surface formed with a layer made of an electroconductive polymer.

7. A method of producing an aluminum electrolytic capacitor, comprising:
rolling an anode foil connected to an anode lead and a cathode foil connected to a cathode lead together with a separator to prepare a capacitor element, and impregnating said capacitor element with a driving electrolyte;
inserting said capacitor element into a tubular metal case having one closed end and the other open end;
hermetically closing said open end by a sealing member; and
bending said anode and cathode leads along an outer surface of said sealing member,
wherein said sealing member is comprised of a rubber composition containing:
a rubber component having, as a primary constituent, a butyl rubber prepared by crosslinking an isobutylene-isoprene copolymer having an unsaturation degree of 1.2 to 2.5 mol %, with an alkyl-phenol-formaldehyde resin; and
100 to 200 mass parts of reinforcing filler with respect to 100 mass parts of said rubber component,
wherein said sealing member is prepared by kneading a mixture comprising said isobutylene-isoprene copolymer, said alkyl-phenol-formaldehyde resin and said reinforcing filler, molding said kneaded mixture under reduced pressure, and then annealing the obtained product to treatment under reduced pressure.

* * * * *